United States Patent
Sarrasin

(12) 
(10) Patent No.: US 6,183,560 B1
(45) Date of Patent: Feb. 6, 2001

(54) PARTICULATE MATERIAL BLENDER AND POLISHER

(76) Inventor: Jean-Marie Joseph Sarrasin, Box 125, Morris, Manitoba (CA), R0G 1K0

(*) Notice: Under 35 U.S.C. 154(b), the term of this patent shall be extended for 0 days.

(21) Appl. No.: 09/130,640

(22) Filed: Aug. 5, 1998

(51) Int. Cl.[7] .................................................. B05C 3/08
(52) U.S. Cl. ........................... 118/417; 118/426; 118/19; 366/319; 366/320; 366/172.1
(58) Field of Search ................... 366/320, 319, 366/322, 168.1, 172.1, 172.2; 118/417, 426, 19

(56) References Cited

U.S. PATENT DOCUMENTS

| | | | |
|---|---|---|---|
| 567,509 | * 9/1896 | Reitz | 366/321 X |
| 2,888,045 | * 5/1959 | Reaves et al. | 366/322 X |
| 3,382,536 | * 5/1968 | Fritsch et al. | 366/321 X |
| 3,652,064 | * 3/1972 | Lehnen et al. | 366/321 |
| 4,465,017 | 8/1984 | Simmoms . | |
| 4,483,625 | * 11/1984 | Fisher | 366/196 X |
| 5,186,840 | * 2/1993 | Cristy | 366/320 X |
| 5,358,331 | * 10/1994 | Cruse | 366/320 X |

FOREIGN PATENT DOCUMENTS 56-158135 * 12/1981 (JP) ..................................... 366/322

* cited by examiner

*Primary Examiner*—Laura Edwards
(74) *Attorney, Agent, or Firm*—Adrian D. Battison; Michael R. Williams

(57) ABSTRACT

A continuous flow particulate material blender includes a tubular housing having an input on a first end of the housing and an output on a second end of the housing. A shaft is mounted for rotation within the housing and includes ribbon flighting to urge the flow of particulate material towards the output, flow bars for mixing the particulate material in the direction of the flow and retarder bars for mixing the particulate material against the flow. Located near the first end of the housing are fluid additive lines and a dry additive dispenser for supplying additives to the particulate material. An end plate is mounted on both ends of the housing. An aperture in each of the end plates receives a respective end of the shaft. Bearings mounted externally on each end of the housing support the shaft. The rotation of the shaft is driven by a motor mounted on the first end of the housing which connects to the shaft through a gearbox. Access doors along the housing are provided to allow access to the interior of the housing for cleaning purposes.

11 Claims, 3 Drawing Sheets

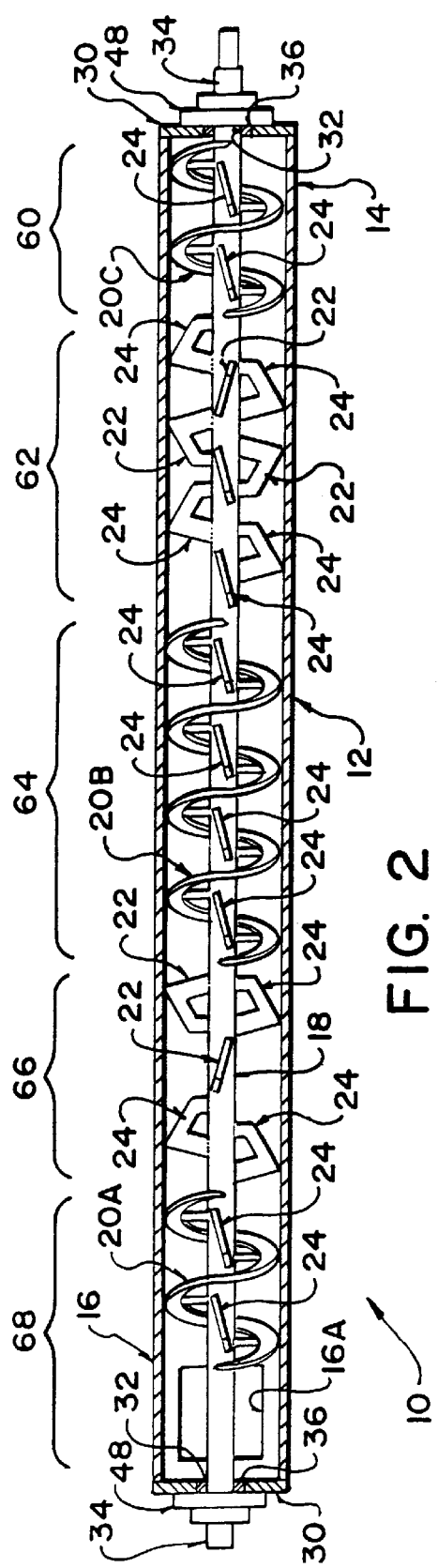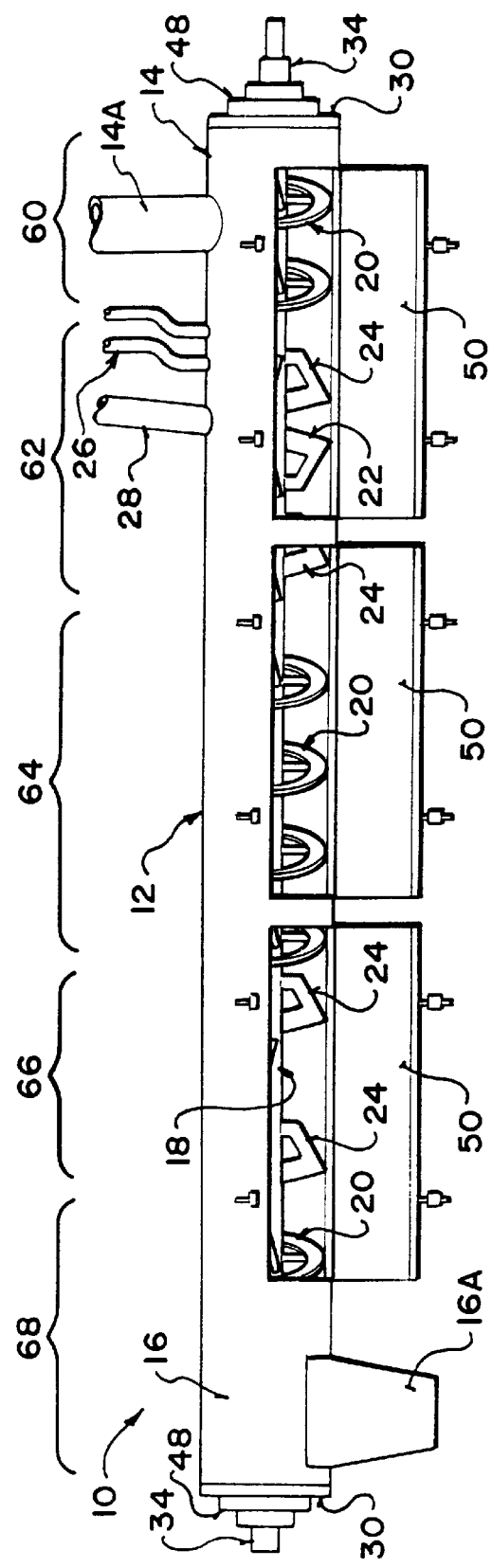

PARTICULATE MATERIAL BLENDER AND POLISHER

FIELD OF THE INVENTION

This invention relates to blenders and polishers for particulate material and more particularly to a continuous flow blender and polisher for polishing and blending additives to seed.

BACKGROUND

Seeds such as peas, lentils, and beans have long been harvested for selling to the general public at a market place. In order to sell this produce however it is required that the produce have some consumer appeal. Consumers will tend to purchase more appealing produce and therefore it is necessary for producers to address the issue of appearance of the produce before the produce is brought to the market place.

When produce such as peas and beans are dehulled and split, the end product is dull. It is desired to take this dull product and make it shiny in appearance without contaminating it in any way. A significant problem occurs however when liquid is added to the products because of the high starch content. The liquid and starch form an adhesive mixture which causes lumps to form in the product. This can cause molding. Also to produce a proper shine additives must be supplied in some form or another to properly coat the product.

The known prior art in devices for blending or mixing additives do not supply enough liquid and do not distribute the additives evenly enough for produce with high starch such as peas and beans. These devices are not designed to mix large volumes of produce with additives and coat the produce in a continuous single stage machine while polishing the produce. They are most often in the form of batch processes which cannot keep up with the large volumes required by some producers.

The closest known prior art U.S. Pat. No. 4,465,017 to Simmons describes a seed coating machine having an upper and lower mixing drum. Liquid additives coat the seed in the upper mixing drum. The seeds are then passed from the upper drum to the lower drum through a drying chamber. In the lower drum powders are sifted onto the seed for adhering to the liquid additive previously applied. The machine requires time for drying and sifting operations making the machine unsuitable for large coating operations. Also the machine lacks the versatility to perform mixing or polishing operations as well as coating.

According to the invention there is provided an apparatus for mixing particulate material which includes a generally elongate housing having an input feed on an input end of the housing and an output discharge on an output and of the housing for flow of the particulate material through the housing. A shaft mounted within the housing for rotation about a longitudinal axis of the shaft is driven by a motor and carries at least one section of ribbon flighting mounted on the shaft for rotation with the shaft and arranged such that rotation of the shaft in a normal direction causes flow of the particulate material forwardly of the housing from the input end to the output end of the housing. A plurality of flow bars extend from the shaft at spaced positions along the length of the shaft and mounted on the shaft to rotate with the shaft and a plurality of retarder bars also extend from the shaft at spaced positions along the length of the shaft and mounted on the shaft to rotate with the shaft. Each of the flow bars and the retarder bars comprises a U-shaped member having two legs connected at an inner end to the shaft and an outer main cross-member connecting the legs at a position spaced outwardly from the shaft. Each of the flow bars is inclined to the axis of the shaft in a direction such that rotation of the shaft in the normal direction causes the flow bars to urge the particulate material forwardly of the housing and each of the retarder bars is inclined to the axis of the shaft in a direction such that rotation of the shaft in the normal direction causes the retarder bars to urge the particulate material rearwardly of the housing such that the flow bars and the retarder bars co-operate to effect mixing of the particulate material.

The apparatus can be used with a dispenser of dry and/or liquid additive materials for blending and polishing the particulate material.

BRIEF DESCRIPTION OF THE DRAWINGS

In the accompanying drawings, which illustrate an exemplary embodiment of the present invention:

FIG. 2 is a top view of the blender and polisher showing the blending arms with the housing and components mounted to the housing removed;

FIG. 3 is a side view of the blender and polisher with the access doors in an opened position and the components mounted to the housing removed.

DETAILED DESCRIPTION

Figure 1:
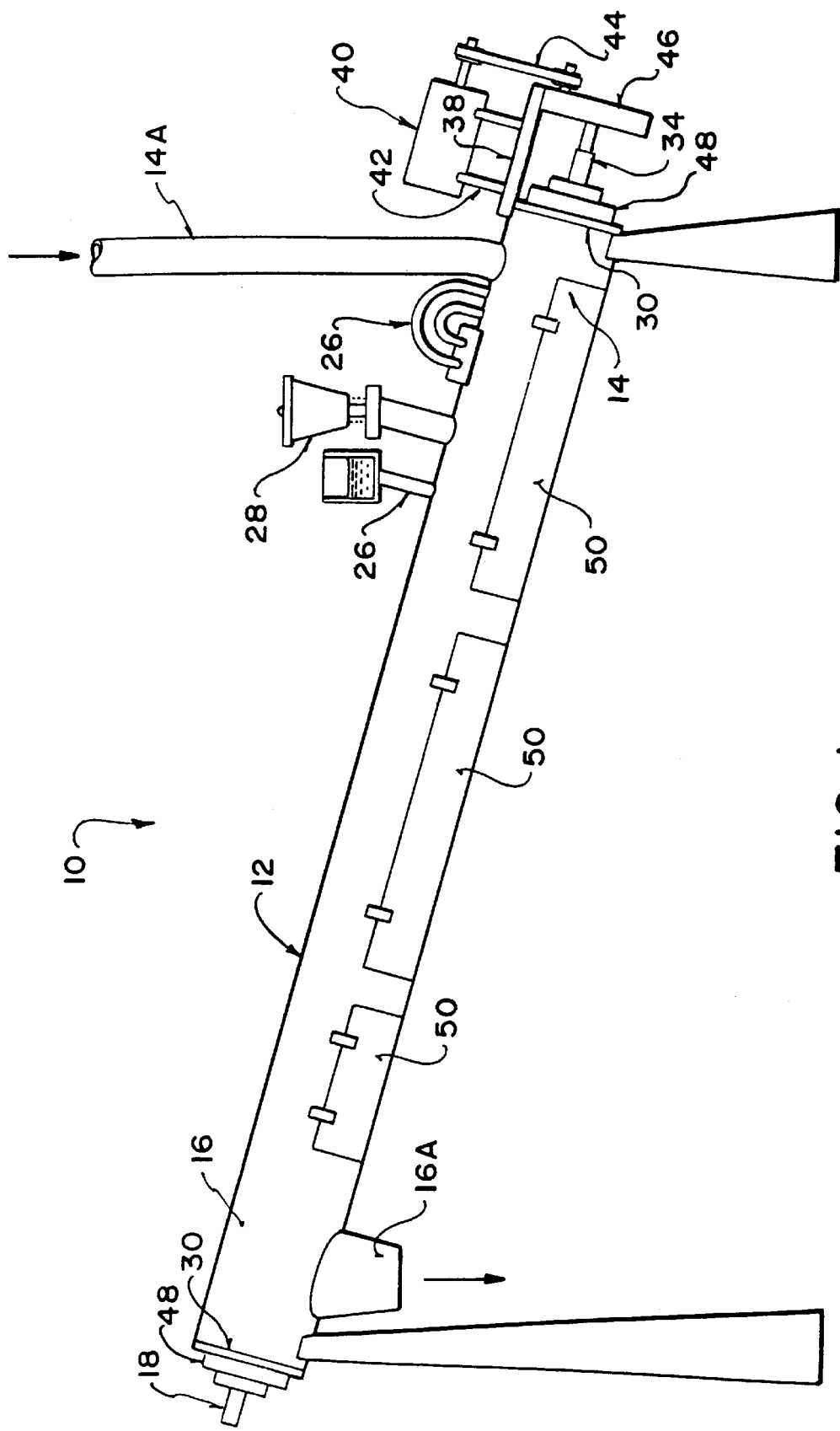
FIG. 1 is a side elevation view of the blender and polisher.

Referring to the accompanying drawings, there is illustrated a particulate material blender and polisher generally indicated by the number 10. The blender and polisher is in the form of a tubular housing 12 having an input 14A at an input end 14 and an output 16A at an output end 16 for continuous flow of the particulate material through the housing. The output end 16 is elevated in relation to the input 14 such that the flow of particulate material is inclined upwards as it passes through the blender to aid in the churning and mixing process as well as increase the blending and polishing time for the particulate material to reach the output from the input.

A shaft 18 is mounted within the housing such that the shaft is free to rotate. The sections 20A, 20B and 20C of ribbon flighting 20 extend from the shaft 18 to rotate with the shaft for urging the flow of particulate material through the housing 12 from the input 14 to the output 16. Flow bars 22 extend from the shaft 18 to rotate with the shaft. The flow bars 22 are in the form of U-shaped bars oriented to mix the particulate material and urge the particulate material with the flow from the input 14 to the output 16. Retarder bars 24 also extend from the shaft 18 to rotate with the shaft. The retarder bars 24 are in the form of U-shaped bars oriented to mix the particulate material and urge the particulate material against the flow.

Liquid additive lines 26 enter the housing 12 near the input end 14 for supplying liquid additives to the particulate material which will be blended together to form a coating. A dry additive dispenser 28 is mounted on the housing near the input 14 for supplying powdered and granular additives to the particulate material which will be blended together to form a coating as well as aid in the polishing process.

An end plate 30 is mounted on each end of the housing. The end plate 30 has an aperture 32 for receiving an end 34 of the shaft. A seal 36 surrounds the shaft 18 for sealing between the shaft and the end plate 30.

A plate 38 extends outwards from an end of the housing near the input 14 for mounting a motor 40 using connecting rods 42. A drive belt 44 connects the motor output to a gearbox 46 which is connected to one of the ends of the shaft 34 for driving the rotation of the shaft 18.

Bearings 48 are mounted externally on the housing 12 for supporting the weight of the shaft 18. The bearings 48 are located externally for containing any bearing grease away from the produce within the housing 12 as well as for ease of adding more lubrication.

The housing 12 also includes a set of access doors 50 such that opening the doors will expose inner components of the blender. The blender 10 requires some cleaning internally due to the sticky nature of the produce. This cleaning process is easily accomplished with the access doors 50 in an open position.

In operation, the particulate material enters the blender and polisher through the input 14 to an input section 60 where the first section of ribbon flighting 20C feeds the particulate material into the first blending section 62. In the first blending section 62 water, liquid additives and dry additives are introduced and vigorously blended with the particulate material by the retarder bars 24 and the flow bars 22 to evenly coat the particulate material. A feed section 64 including a second section of ribbon flighting 20C feeds the particulate material from the first blending section 62 to a second blending section 66 while providing a gentle mixing action. In the second blending section 66 the particulate material is vigorously blended once again and polished before being discharged from a discharge section 68. The discharge section 68 includes a third section of ribbon flighting 20A for urging the particulate material through the output 16.

Figure 4:
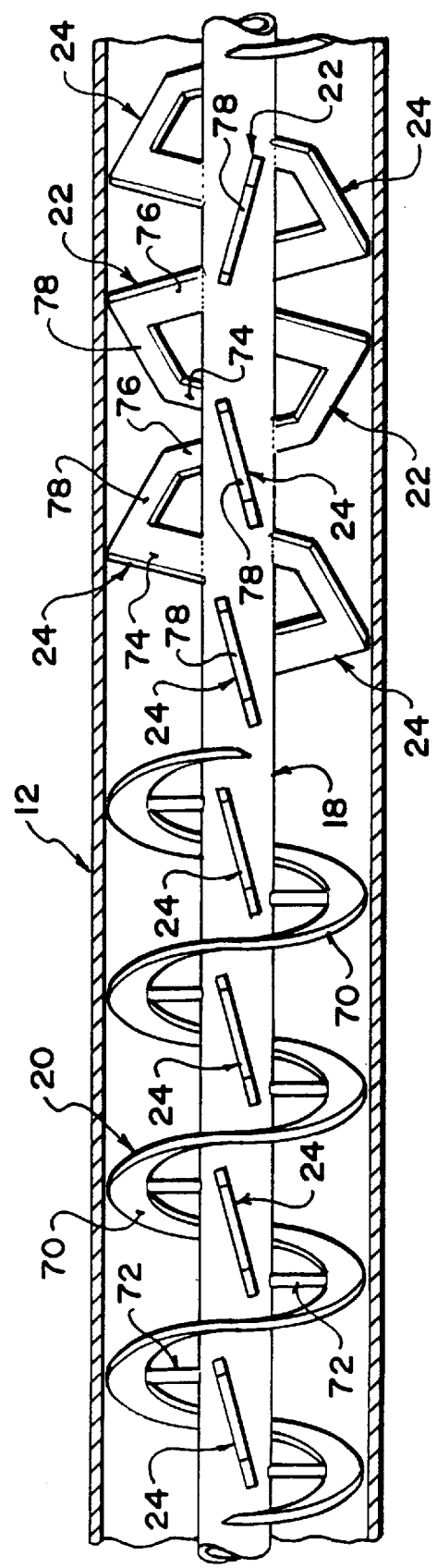
FIG. 4 is an enlarged portion of FIG. 2 displaying the blending arms.

Referring to FIG. 4 there is shown an enlarged portion of the shaft 18 including the ribbon flighting 20, the flow bars 22 and the retarder bars 24. The ribbon flighting 20 includes a helical strip 70 surrounding the shaft and being spaced from the shaft 18 with the use of spacer bars 72. The spacer bars 72 extend radially from the shaft 18 such that the helical strip 70 contacts an inner face of the housing 12 as the shaft is rotated.

The flowbars 22 and the retarder bars 24 each include a first side member 74, a second side member or leg 76 and a main or leg member 78 connecting the legs. The first and second side members 74, 76 are connected to and extend radially from the shaft 18. The main member 78 connects from the first side member 74 to the second side member 76 at a location spaced outwardly from the shaft 18 such that the main member is located near the inner face of the housing 12 but the main member does not contact the inner face of the housing.

The flowbars 22 are angled in relation to the axis of rotation of the shaft 18 so as to urge the particulate material forward from the input 14 to the output 16 as the shaft is rotated in normal operation. The retarder bars 24 are angled in relation to the axis of rotation of the shaft 18 so as to urge the particulate material rearward from the output 16 to the input 14 as the shaft is rotated in normal operation.

The blender and polisher 10 is suitable for blending or mixing a variety of products with or without additives as well as polishing a variety of produce. These include dry goods such as feeds or fertilisers as well as damp goods such as silage with minerals. Coating operations such as dust suppression or inoculates and oils on seeds can also be accomplished with the blender and polisher 10.

While one embodiment of the present invention has been described in the foregoing, it is to be understood that other embodiments are possible within the scope of the invention. The invention is to be considered limited solely by the scope of the appended claims.

What is claimed is:

1. Apparatus for mixing particulate material comprising:
    a housing having an input feed on an input end of the housing and an output discharge on an output end of the housing for flow of the particulate material through the housing;
    a shaft mounted within the housing for rotation about a longitudinal axis of the shaft;
    drive means for rotating the shaft;
    at least one section of ribbon flighting mounted on the shaft for rotation with the shaft and arranged such that rotation of the shaft in a normal direction causes flow of the particulate material forwardly of the housing from the input end to the output end of the housing;
    a plurality of flow bars extending from the shaft at spaced positions along the length of the shaft and mounted on the shaft to rotate with the shaft; and
    a plurality of retarder bars extending from the shaft at spaced positions along the length of the shaft and mounted on the shaft to rotate with the shaft;
    each of the flow bars and the retarder bars comprising a U-shaped member having two legs connected at an inner end to the shaft and an outer main cross-member connecting the legs at a position spaced outwardly from the shaft;
    each of the flow bars being inclined to the axis of the shaft in a direction such that rotation of the shaft in the normal direction causes the flow bars to urge the particulate material forwardly of the housing;
    each of the retarder bars being inclined to the axis of the shaft in a direction such that rotation of the shaft in the normal direction causes the retarder bars to urge the particulate material rearwardly of the housing;
    such that the flow bars and the retarder bars co-operate to effect mixing of the particulate material.

2. The apparatus of claim 1 wherein the output end is elevated in relation to the input end.

3. The apparatus of claim 1 including at least one fluid additive line entering the housing near the particulate material input for supplying liquid additives to the particulate material and a dry additive dispenser near the particulate material input for supplying powdered and granular additives to the housing.

4. The apparatus of claim 1 including at least one access door along the housing such that opening said at least one access door exposes inner components of the blender for cleaning the inner components.

5. The apparatus of claim 1 including:
    an input section having a first section of ribbon flighting;
    a first blending section following the input section having a plurality of said flow bars and retarder bars;
    a feed section following the first blending section having a second section of ribbon flighting;
    a second blending section following the feed section having a plurality of said flow bars and retarder bars; and
    a discharge section following the second blending section having a third section of ribbon flighting.

6. Apparatus for mixing particulate material with at least one additive and for polishing the particulate material comprising:

a housing having an input feed on an input end of the housing and an output discharge on an output end of the housing for flow of the particulate material through the housing;

at least one additive dispenser for dispensing additive into the housing for mixing with the particulate material;

a shaft mounted within the housing for rotation about a longitudinal axis of the shaft;

drive means for rotating the shaft;

at least one section of ribbon flighting mounted on the shaft for rotation with the shaft and arranged such that rotation of the shaft in a normal direction causes flow of the particulate material forwardly of the housing from the input end to the output end of the housing;

a plurality of flow bars extending from the shaft at spaced positions along the length of the shaft and mounted on the shaft to rotate with the shaft; and a plurality of retarder bars extending from the shaft at spaced positions along the length of the shaft and mounted on the shaft to rotate with the shaft;

each of the flow bars and the retarder bars comprising a U-shaped member having two legs connected at an inner end to the shaft and an outer main cross-member connecting the legs at a position spaced outwardly from the shaft;

each of the flow bars being inclined to the axis of the shaft in a direction such that rotation of the shaft in the normal direction causes the flow bars to urge the particulate material forwardly of the housing;

each of the retarder bars being inclined to the axis of the shaft in a direction such that rotation of the shaft in the normal direction causes the retarder bars to urge the particulate material rearwardly of the housing;

such that the flow bars and the retarder bars co-operate to effect mixing of the particulate material with the additive and blending of the additive with the particulate material to effect polishing of the particulate material.

7. The apparatus of claim 6 wherein the output end is elevated in relation to the input end.

8. The apparatus of claim 6 wherein the at least one additive dispenser comprises at least one fluid additive line entering the housing near the particulate material input for supplying liquid additives to the particulate material.

9. The apparatus of claim 6 wherein the at least one additive dispenser comprises a dry additive dispenser near the particulate material input for supplying powdered and granular additives to the housing.

10. The apparatus of claim 6 including at least one access door along the housing such that opening said at least one access door exposes inner components of the blender for cleaning the inner components.

11. The apparatus of claim 6 including:

an input section having a first section of ribbon flighting;

a first blending section following the input section having a plurality of said flow bars and retarder bars;

a feed section following the first blending section having a second section of ribbon flighting;

a second blending section following the feed section having a plurality of said flow bars and retarder bars; and a discharge section following the second blending section having a third section of ribbon flighting.

* * * * *